(12) United States Patent
Chevalier et al.

(10) Patent No.: US 10,109,169 B2
(45) Date of Patent: Oct. 23, 2018

(54) CONTAINER WITH A DETECTION SYSTEM

(71) Applicant: Stanley Middle East FZE, Dubai (AE)

(72) Inventors: Julien Chevalier, Fagnieres (FR); Thierry Demaretz, Grandpuits (FR); Axel Lehovetzki, Les Lilas (FR)

(73) Assignee: Stanley Black & Decker MEA FZE, Dubai (AE)

( * ) Notice: Subject to any disclaimer, the term of this patent is extended or adjusted under 35 U.S.C. 154(b) by 0 days.

(21) Appl. No.: 14/982,193

(22) Filed: Dec. 29, 2015

(65) Prior Publication Data

US 2016/0117899 A1 Apr. 28, 2016

Related U.S. Application Data

(63) Continuation of application No. PCT/EP2014/062702, filed on Jun. 17, 2014.

(30) Foreign Application Priority Data

Jul. 5, 2013 (EP) ..................................... 13175285

(51) Int. Cl.
*G08B 13/14* (2006.01)
*G08B 13/24* (2006.01)
(Continued)

(52) U.S. Cl.
CPC ........... *G08B 13/2451* (2013.01); *B25H 3/02* (2013.01); *G06Q 10/087* (2013.01); *G08B 13/06* (2013.01); *G08B 13/1427* (2013.01)

(58) Field of Classification Search
CPC ........................... G08B 13/06; G08B 13/1427; G08B 13/2451; B25H 3/00; B25H 3/02; G06Q 10/00; G06Q 10/087
See application file for complete search history.

(56) References Cited

U.S. PATENT DOCUMENTS 6,254,247 B1 * 7/2001 Carson ............... A47G 19/2227
359/32
7,225,980 B2 * 6/2007 Ku ........................ G06K 7/0008
235/383
(Continued)

FOREIGN PATENT DOCUMENTS

CN 201833357 5/2011
DE 20207572 U1 9/2002
(Continued)

*Primary Examiner* — Adnan Aziz
(74) *Attorney, Agent, or Firm* — Caeden Drayton; Adan Ayala (57) ABSTRACT

A portable container for one or more articles each tagged with a respective Radio Frequency Identification (RFID) transponder, the container comprising a detector device for detecting removal and/or placement of RFID-tagged articles in the container; a power supply for supplying electrical power to the detector device; an activation means operable to cause the detector device to detect a reference list of RFID-tagged articles located in the container; a verification means operable by movement of the container to cause the detector device to detect RFID-tagged articles located in the container and to signal deviation from the reference list; and a signal means for transmitting signals from the detector device to a user. The detector device may transmit an article absent signal and/or an unknown article signal. The detector device may comprise an external antenna configured to detect RFID-tagged articles outside the container.

17 Claims, 3 Drawing Sheets

(51) Int. Cl.
  *B25H 3/02* (2006.01)
  *G08B 13/06* (2006.01)
  *G06Q 10/08* (2012.01)

(56) References Cited

U.S. PATENT DOCUMENTS

| | | | | |
|---|---|---|---|---|
| 7,703,226 | B2* | 4/2010 | Schnuckle | B65D 23/085 |
| | | | | 359/439 |
| 7,880,613 | B1* | 2/2011 | Maeng | G06K 7/0008 |
| | | | | 340/10.42 |
| 8,717,165 | B2* | 5/2014 | Gernandt | G06K 19/0705 |
| | | | | 340/539.13 |
| 2003/0102970 | A1* | 6/2003 | Creel | G06K 17/00 |
| | | | | 340/568.1 |
| 2005/0006449 | A1* | 1/2005 | D'Amato | B65D 3/06 |
| | | | | 229/400 |
| 2005/0083676 | A1* | 4/2005 | VanderSchuit | A23G 3/563 |
| | | | | 362/84 |
| 2005/0110638 | A1* | 5/2005 | Mohr | G06Q 10/087 |
| | | | | 340/572.1 |
| 2005/0242957 | A1* | 11/2005 | Lindsay | G06K 19/0716 |
| | | | | 340/572.7 |
| 2006/0043178 | A1* | 3/2006 | Tethrake | G06K 19/07749 |
| | | | | 235/385 |
| 2006/0087436 | A1* | 4/2006 | Reddy | G06K 19/0716 |
| | | | | 340/572.3 |
| 2007/0001809 | A1* | 1/2007 | Kodukula | G06K 7/0008 |
| | | | | 340/10.1 |
| 2007/0152829 | A1* | 7/2007 | Lindsay | G06K 19/0717 |
| | | | | 340/572.3 |
| 2008/0157967 | A1* | 7/2008 | Jones | G01G 15/00 |
| | | | | 340/572.1 |
| 2009/0016308 | A1* | 1/2009 | Twitchell, Jr. | H01Q 1/2208 |
| | | | | 370/338 |
| 2009/0256680 | A1* | 10/2009 | Kilian | G06K 7/0008 |
| | | | | 340/10.1 |
| 2010/0033325 | A1 | 2/2010 | Vilkomirski et al. | |
| 2010/0039513 | A1 | 2/2010 | Glickman et al. | |
| 2010/0087953 | A1* | 4/2010 | Garson | A47F 3/001 |
| | | | | 700/241 |
| 2010/0252626 | A1* | 10/2010 | Elizondo | G06Q 10/087 |
| | | | | 235/385 |
| 2013/0107498 | A1* | 5/2013 | McClaughry | A47F 3/001 |
| | | | | 362/101 |
| 2014/0062699 | A1* | 3/2014 | Heine | G06Q 10/087 |
| | | | | 340/572.1 |
| 2015/0091705 | A1* | 4/2015 | Banegas | G06K 17/0022 |
| | | | | 340/10.6 |

FOREIGN PATENT DOCUMENTS

| | | | |
|---|---|---|---|
| DE | 102008013588 A1 * | 9/2009 | ............... B25H 3/00 |
| DE | 102008031372 A1 | 7/2010 | |
| EP | 0622158 A1 | 4/1994 | |
| GB | 2397704 A | 7/2004 | |
| GB | 2465807 A | 6/2010 | |
| KR | 20130060014 A | 7/2013 | |

* cited by examiner

CONTAINER WITH A DETECTION SYSTEM

CROSS-REFERENCE TO RELATED APPLICATIONS

This application claims priority from PCT Application No. PCT/EP2014/062702, international filing date of Jun. 17, 2014, which claims priority from EP 13175285.9 filed Jul. 5, 2013 the disclosure of which is incorporated herein by reference in its entirety.

FIELD OF THE INVENTION

The present invention relates to a portable container with a detector device for detecting removal and/or placement of articles in the container and a method of detecting removal and/or placement of articles in a portable container.

BACKGROUND OF THE INVENTION

Although the following description refers to a tool bag it will be appreciated by the person skilled in the art that the apparatus for detecting the presence of articles in a container can be used in any portable container, for example, tool cabinets, tool cupboards, tool boxes, backpacks, and the like, and it is not limited to tool bags.

The use of tool bags to contain tools and accessories for tools is well known. When an operator is performing a job on site tools and other articles are routinely removed from a tool bag to perform the job but they may not be replaced in the tool bag after the job is finished. The tools and other articles may remain at the job site and/or become lost. This is a problem because many tools are expensive to replace. It is also problem in industrial environments where mislaid tools or other articles risk causing damage to machinery. Many industrial environments, for example, aerospace, railway, shipbuilding, nuclear, automobile, or petrochemical sectors, are particularly sensitive to what is referred to as 'foreign object damage' to their machinery. Naturally, these sectors are particularly interested in foreign object exclusion solutions.

German utility model No. DE 202 07 572 U1 discloses a tool box carried by craftspeople to jobs outside their own workshop. The tools do not have a space permanently allocated to them in the tool box. Instead, the tools lie loosely in disorder in the tool box. Whilst this may be an efficient use of space within the tool box, it is not easy to visually inspect which tools are in the tool box. So, each tool comprises a smart label like that known in the retail industry. The tool box comprises an interrogation device. Upon activation, the interrogation device determines the completeness or incompleteness of the tools in the tool box. The interrogation device may be programmed to determine which tools are missing and indicate them on a display.

A smart label is a type of Radio Frequency Identification (RFID) transponder. An RFID transponder is an electronic identification device that may be used to uniquely identify and track various articles. In practice, an RFID transponder is attached to an article, and a RFID reader like the interrogation device of DE 202 07 572 U1 senses the presence and identifying information associated with the RFID transponder. The RFID transponder may be active, semi-active, or passive and may or may not include storage memory. The RFID transponder contains information, for example the type and serial number of the tool to which it is tagged.

United Kingdom patent publication No. GB 2 451 957 A discloses a tool box equipped with a handle, a detection means, an activation button, an alarm and an LCD display screen. In use, the tool box contains a number of tools tagged with RFID transponders which the tool box is intended to transport from site to site. The RFID transponders are registered to their corresponding tools on an external computer and the registration data is downloaded to the tool box. The detection means is configured to detect if any tools are missing from the tool box using the registration data. When a user arrives at site, the activation button is pressed, the detection means scans the contents of the tool box and records the RFID-tagged tools into a first inventory stored in a memory of the detection means. Once the job is complete, the user gathers the RFID-tagged tools and replaces them in the tool box. The activation button is pressed again, the detection means scans the contents of the tool box and compiles a second inventory for comparison with the first inventory. If the detection means identifies that any RFID-tagged tools are missing that were present the first time the activation button was pressed, the alarm sounds to alert the user. The name of the missing tool and its RFID transponder number are displayed to the user on the LCD screen. GB 2 451 957 A discloses a variant tool box where the detection means continually scans the presence of RFID-tagged tools in the tool box. The variant detection means alerts the user if any RFID-tools are missing when the tool box lid is closed.

In a busy working environment, users of the aforementioned tool boxes may not have time, or may forget, to activate the detection means on a regular basis. A missing RFID-tagged tool may not be noticed until a long time after it has been lost. Even if the missing tool is identified by the detection means this is of little use if the missing tool cannot be physically found because the user cannot recall when and where it was last used. Thus, inattention to regular activation of the detection means may result in time being wasted while the user searches for a missing tool. The missing tool may not eventually be found. On the other hand, continual cyclical activation of the detection means either requires more electrical power and frequent recharging of a portable electrical power source or it requires connection to an external power source. Either option would inhibit mobility.

BACKGROUND OF THE INVENTION

It is an aim of the present invention to overcome or at least mitigate the aforementioned problems. In a first aspect of the invention there is provided a portable container for one or more articles each tagged with a respective RFID transponder, the container having at least one opening into the container and a detector device for detecting removal and/or placement of RFID-tagged articles in the container, wherein the container comprises: a power supply for supplying electrical power to the detector device, an activation means in communication with the detector device, wherein the activation means is operable to cause the detector device to detect a reference list of RFID-tagged articles located in the container; a verification means in communication with the detector device, wherein the verification means is operable by movement of the container to cause the detector device to detect RFID-tagged articles located in the container and to signal deviation from the reference list; and a signal means in communication with the detector device for transmitting signals from the detector device to a user. The activation means enables a user to record a reference list of RFID-tagged articles initially selected to perform a job. The user transports the container to the work site and begins the job. At the end of the job, or working day, the user returns to the source of the RFID-tagged articles. The involves moving the container which automatically operates the verification means and causes the detector device to detect and compare the RFID-tagged articles actually in the container with the reference list. If there are too many, or too few, articles then the user has taken someone else's property or forgotten their own articles. The user is automatically alerted by the signal means to any deviation between what actually is, and what should be, in the container before the user has left the work site. The signal means may transmit any signal that attracts the attention of the user, for example, an information display signal, an optical signal, an audible signal or tactile signal such as vibration. The signal may vary according to the type information to be transmitted. Advantageously, the user is alerted promptly by the signal means thus making it easier to search for missing articles or return someone else's articles before the situation evolves and the memory fades. Inattention on the part of the user cannot neglect to operate the detector device; this occurs automatically when the container is moved. The detector device is only operated by the verification means when the container moves and not continuously. This economises on electrical power consumption by the detector device.

Preferably, the detector device is configured to signal an article absent signal upon detection of absence of a RFID-tagged article on the reference list and the detector device is configured to signal an unknown article signal upon detection of a RFID-tagged article not on the reference list. Thus, the user can tell whether there are too many, or too few, articles in the container and react accordingly.

The detector device may be lockable against detection of the reference list. Locking of the detector device prevents accidental modification to the reference list after it has been recorded by the user. Thus, the user can be sure that any deviation signal relates to deviation from the original reference list. A key is needed to enable modification to the reference list. This may be required, for example, at the end of the working day when the user may wish to empty the container of RFID-tagged tools and reset the reference list to zero in preparation for another working day.

Preferably, the detector device is configured to signal an initialisation signal upon location in the container of a RFID-tagged key configured to permit detection of the reference list. The initialisation signal confirms that the reference list has been established in the presence of the RFID-tagged key. The user obtains the RFID-tagged key to unlock the detector device.

The verification means may comprise an accelerometer. An accelerometer experiences acceleration associated with movement of weight. This is a simple means of detecting movement of the container which does not rely on interaction with anything outside the container.

The signal means may comprise at least one LED. LEDs are reliable means of providing an optical signal to a user. Advantageously, LEDs are more efficient than, for example, conventional filament lamps. This may help to economise electrical power consumption by the detector device.

Preferably, the or each LED is a multicoloured LED. This enables the detector device to provide different colour optical signals according to the nature of the signal transmitted. This may help to clarify the meaning of the various signals when they are transmitted optically to the user.

The container may comprise a translucent body optically coupled to the or each LED. The translucent body helps to diffuse light from the or each LED to provide a glowing optical signal.

If the container comprises a handle then preferably the translucent body forms at least part of the handle. The handle is an important part of the container which provides prominent a place to transmit optical signals to a user.

The signal means may comprise a display configured to display the number and/or identify of RFID-tagged articles detected by the detector device in the container. A display can provide detailed information on the RFID-tagged articles.

Preferably, the display is configured to display the article absent signal, wherein the article absent signal comprises number and/or identify of absent RFID-tagged articles. Thus, the user knows which particular RFID-tagged article is missing outside the container and the user need not search amongst the articles inside the container. This may save time, especially if the missing article is visible to the user.

The detector device may comprise a transponder reader device comprising an antenna reader and at least one internal antenna in communication with the antenna reader, wherein the or each internal antenna is configured to detect only RFID-tagged articles in the container. This may avoid false detection of RFID-tagged articles outside the container which could fool the user into thinking that the complete reference list of articles is inside the container when this is not true.

The detector device may comprise an external antenna in selectable communication with the antenna reader, wherein the external antenna is configured to detect RFID-tagged articles outside the container. Detection of RFID-tagged articles with the external antenna may occur upon selection by the user. Preferably, the external antenna is configured to detect only RFID-tagged articles on the initial reference list. This filters unwanted detection of articles that the user is not searching for and may save the user time and effort.

The external antenna may be portable in relation to the container. This may improve the range of the antenna.

The detector device may comprise a data processing device having a central processing unit and a memory for recording at least the reference list.

The container may comprise one of a tool cabinet, a tool cupboard, a tool box, or a tool bag. The container of the invention may be any one of those commonly used in the industrial or workshop environment. The container may be for containment of one or more RFID-tagged tools. Tools can be expensive and it is beneficial to provide a device for tracking and retaining tools lest they become lost or misplaced inside machinery where they can cause inestimable damage.

In a second aspect of the invention, there is provided a method of detecting removal and/or placement of articles in a container, wherein each article is tagged with a respective RFID transponder, wherein the container has at least one opening into the container, a detector device for detecting removal and/or placement of RFID-tagged articles in the container, a power supply for supplying electrical power to the detector device, an activation means in communication with the detector device, a verification means in communication with the detector device, and a signal means in communication with the detector device for transmitting signals from the detector device to a user, and wherein the method comprises the steps of: (a) operating the activation means to cause the detector device to detect a reference list of RFID-tagged articles located in the container and optionally to detect a RFID-tagged key configured to permit detection of the reference list; and (b) operating the verification means by movement of the container to cause the detector device to detect RFID-tagged articles located in the container and to signal detection of deviation from the reference list. The second aspect or the invention provides substantially the same advantages as the first aspect. The optional additional feature may reassure the user that any deviation signal relates to deviation from the original reference list established in the presence of the RFID-tagged key. Accidental modification to the reference list is not possible; the user must obtain the RFID-tagged key to unlock the detector device.

In an alternative aspect of the invention, there is provided a portable container for one or more articles each tagged with a respective RFID transponder, the container having at least one opening into the container and a detector device for detecting removal and/or placement of RFID-tagged articles in the container, wherein the container comprises: a power supply for supplying electrical power to the detector device; an activation means in communication with the detector device, wherein the activation means is operable to cause the detector device to detect RFID-tagged articles located in the container; a signal means in communication with the detector device for transmitting signals from the detector device relating to RFID-tagged articles located in the container, wherein the signal means comprises an optical signal generator; and a translucent body optically coupled to the optical signal generator. The optical signal generator may be any means of producing a light, like, for example, a filament lamp or an LED. Preferably, the container comprises a handle and wherein the translucent body forms at least part of the handle. Preferably, the handle is elongate and the translucent body extends along the majority of the axis of elongation of the handle. Preferably, the translucent body surround the axis of elongation of the handle. Preferably, the optical signal generator comprises at least one LED. Preferably, the or each LED is a multicoloured LED.

Preferably, the activation means is operable to cause the detector device to detect a reference list of RFID-tagged articles located in the container, wherein the portable container comprises a verification means in communication with the detector device, and wherein the verification means is operable by movement of the container to cause the detector device to detect RFID-tagged articles located in the container and to signal deviation from the reference list. Preferably, the detector device is configured to signal an article absent signal upon detection of absence of a RFID-tagged article on the reference list and the detector device is configured to signal an unknown article signal upon detection of a RFID-tagged article not on the reference list. Preferably, the detector device is lockable against detection of the reference list. Preferably, the detector device is configured to signal an initialisation signal upon location in the container of a RFID-tagged key configured to permit detection of the reference list. Preferably, the verification means comprises an accelerometer. Preferably, the signal means comprises a display configured to display the number and/or identify of RFID-tagged articles detected by the detector device in the container. Preferably, the display is configured to display the article absent signal and wherein the article absent signal comprises the number and/or identify of absent RFID-tagged articles. Preferably, the detector device comprises a transponder reader device comprising an antenna reader and at least one internal antenna in communication with the antenna reader and wherein the or each internal antenna is configured to detect only RFID-tagged articles in the container. Preferably, the detector device comprises an external antenna in selectable communication with the antenna reader and wherein the external antenna is configured to detect RFID-tagged articles outside the container. Preferably, the external antenna is configured to detect only RFID-tagged articles on the initial reference list. Preferably, the external antenna is portable in relation to the container. Preferably, the detector device comprises a data processing device having a central processing unit and a memory for recording at least the reference list. Preferably, the container comprises one of a tool cabinet, a tool cupboard, a tool box, or a tool bag. Preferably, the container is for containment of one or more RFID-tagged tools.

BRIEF DESCRIPTION OF THE DRAWINGS

Embodiments and advantages of the invention will be understood by reference to the following description which is given by way of example and in association with the accompanying drawings of which.

DETAILED DESCRIPTION OF THE INVENTION

Figure 1:
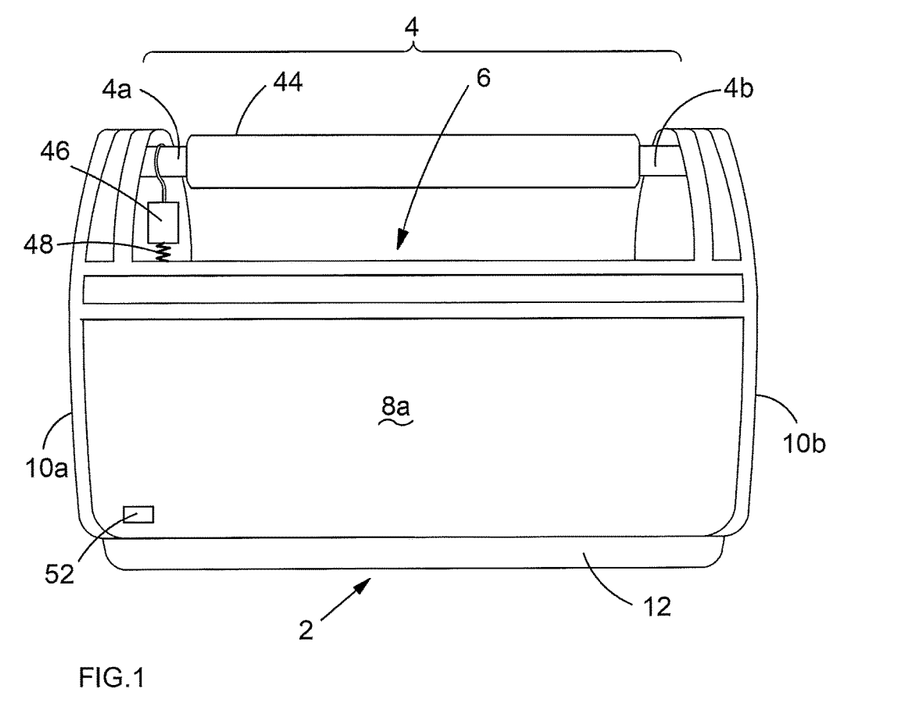
FIG. 1 shows a side elevation view of a container in accordance with an embodiment of the invention.
Figure 2:
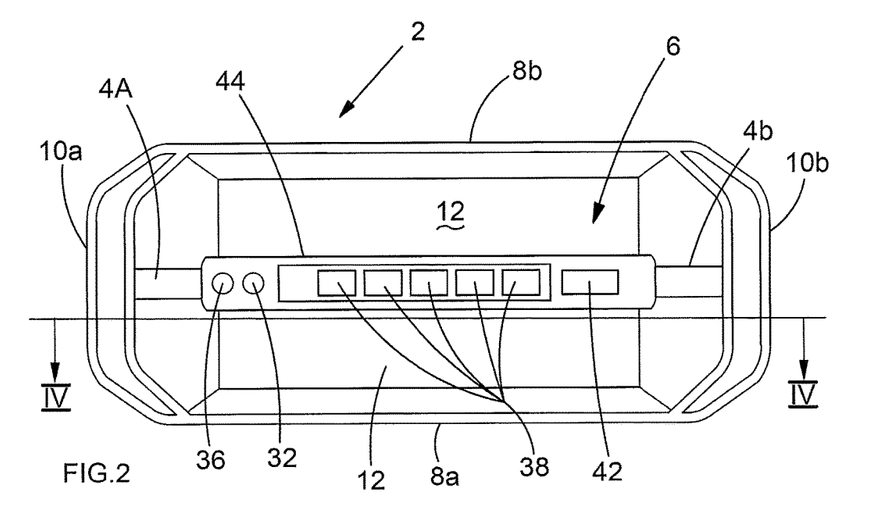
FIG. 2 shows a top view of the container of FIG. 1.

Referring to FIGS. 1 and 2, there is shown a container in the form of a tool bag 2. The tool bag 2 comprises a handle 4 and a tool bay 6. The handle 4 is connected to a metal frame which forms the shape of the tool bag 2. The tool bay 6 comprises a pair of opposing side walls 8a, 8b, a pair of opposing end walls 10a, 10b and a base 12. The side walls 8a, 8b and end wall 10a, 10b are made of a flexible and durable material which is clad about the frame of the tool bag 2. The base 12 is made of a rigid plastic material and is fixed to the bottom of the fame. The base 12 comprises an internal cavity 14 the use of which is explained in more detail below. Although not shown, the tool bag 2 may comprise a lid made of the same material as the side walls 8a, 8b and end walls 10a, 10b for locating over the handle 4 and enclosing the tool bay 6.

Figure 3:
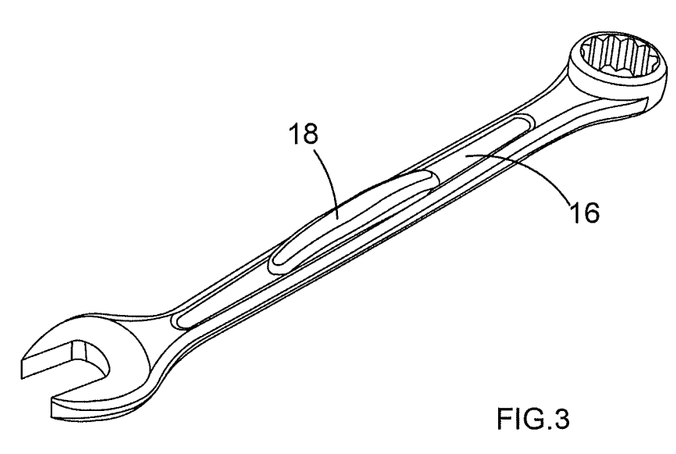
FIG. 3 shows a tool for placement in the container of FIG. 1.

The tool bag 2 is intended to be used as a container for transporting tools 16 each of which is tagged with its own RFID transponder 18 programmed with a unique identification signature. The RFID-tagged tools 16 are loosely located in the tool bay 6 in no particular order such that it is difficult to know by visual inspection exactly which tools 16 are in the tool bay 6 at any one time. The tool bay 6 is shaped to avoid spillage of RFID-tagged tools 16 during transportation. An example RFID-tagged tool 16 is shown in FIG. 3.

Figure 4:
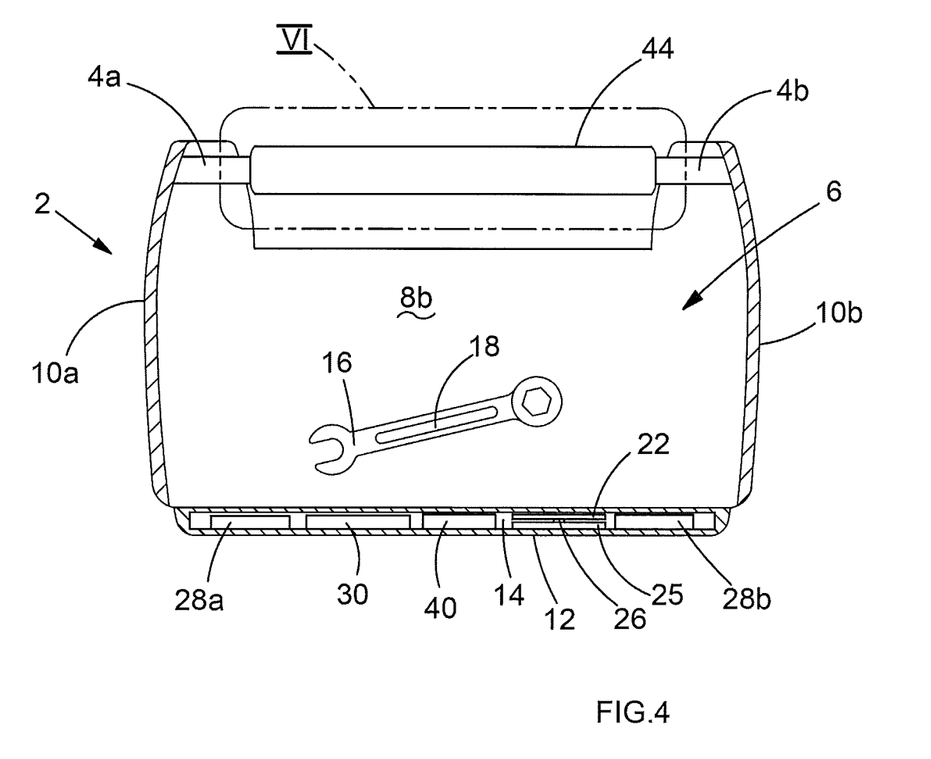
FIG. 4 shows a cross-section view IV-IV of the container of FIG. 1.
Figure 5:
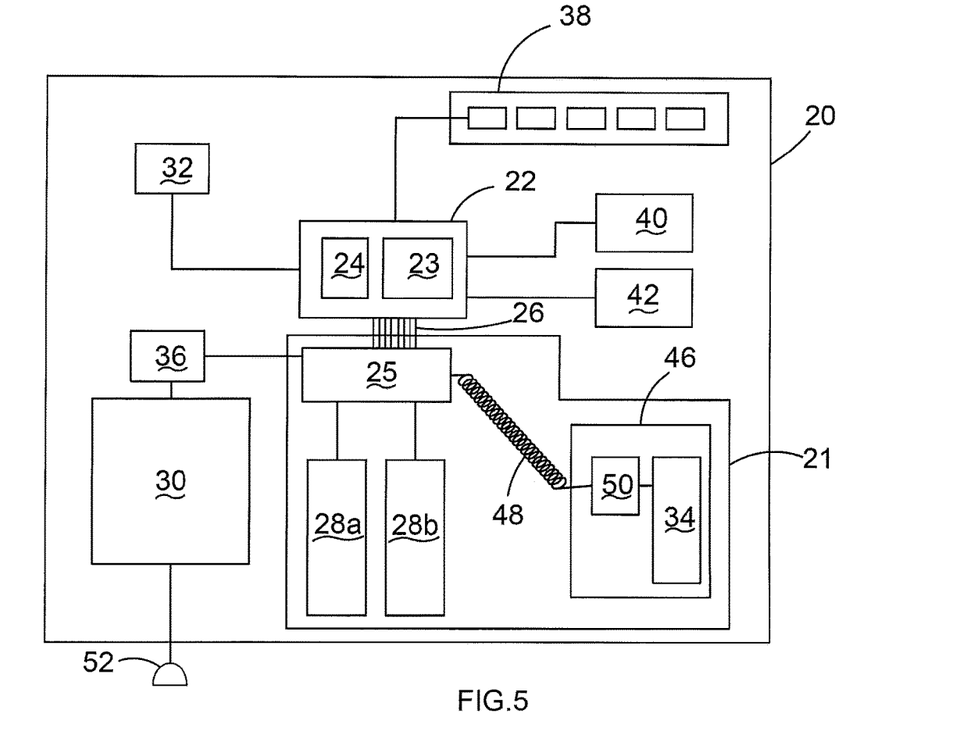
FIG. 5 shows a block diagram of an electrical circuit of the container of FIG. 1.
Figure 6:
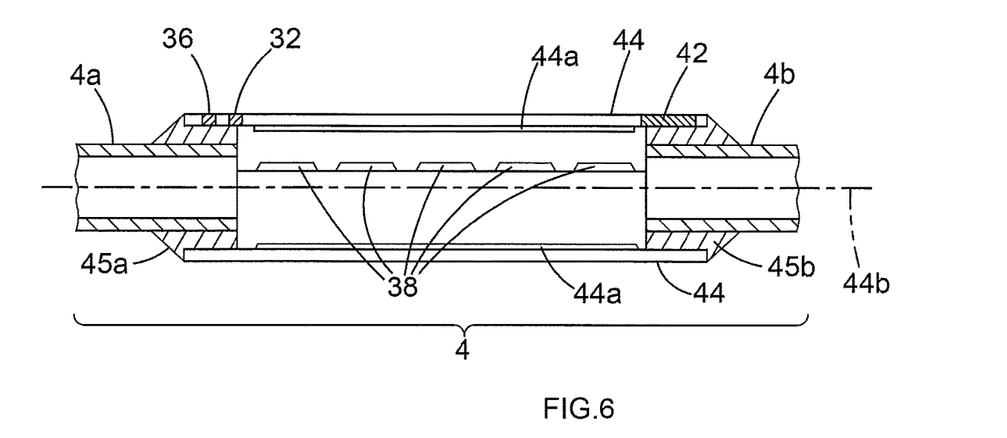
FIG. 6 shows a cross-section view of detail VI of a handle of the container of FIG. 1.

Referring to FIGS. 4 to 6, the tool bag 2 is equipped with an electrical circuit 20 for detecting and identifying the number of RFID-tagged tools 16 located in the tool bay 6, detecting if any known RFID-tagged tools 16 are missing from the tool bag 2 once a job is complete, detecting if any unknown RFID-tagged tools 16 are in the tool bag 16 once a job is complete, alerting the user if there is a discrepancy in the number of RFID-tagged tools 16, and locating missing RFID-tagged tools 16. The electrical circuit 20 performs these tasks autonomously and without being networked.

The electrical circuit 20 has a detector device comprising a transponder reader device 21 and a data processing device 22. The data processing device 22 has a central processing unit (CPU) 23 and a memory 24. The data processing device 23 is in communication with an antenna reader 25 of the transponder reader device 21 via a serial link 26. The data processing device 22 and the antenna reader 25 are housed within the cavity 10 of the base 12 for protection from any RFID-tagged tools 16 contained within the tool bay 6. The electrical circuit 20 comprises two internal antennas 28a, 28b, a battery pack 30 and an initialisation button 32 which are directly coupled to the antenna reader 25 except for the battery pack 30 which is coupled to the antenna reader 25 via an on/off button 36. Optionally, the electrical circuit 20 may comprise an external antenna 34 coupled to the antenna reader 25. The external antenna 34, if present, the internal antennas 28a, 28b, and the antenna reader 25 perform the role of the transponder reader device 21 which tracks and identifies RFID-tagged tools 16, as is explained in more detail below. The electrical circuit 20 further comprises rows of multicoloured light emitting diodes (LEDs) 38, a movement detector 40 and an LCD display 42 which are directly coupled to the data processing device 22. The internal antennas 28a, 28b, the battery pack 30 and the movement detector 40 are housed within the cavity 14 of the base 12.

The middle of the handle 4 is formed by an elongate tubular sheath 44 spanning short metal parts 4a, 4b of the handle 4 integrally connected to opposite ends of the metal frame. A first end of the sheath 44 is connected by a gland 45a to the first short metal part 4a of the handle 4. A second end of the sheath 44 opposite to the first end of the sheath is connected by a gland 45b to the second short metal part 4a of the handle 4 opposite to the first short metal part 4b. The sheath 44 is made of any rigid substantially transparent material which is strong enough to support a tool bag 2 full of RFID-tagged tools 16, like, for example, polycarbonate, polyamide or polymethyl methacrylate plastic materials, or the like. The sheath is sized to be grasped by a user's hand. The initialisation button 32, the on/off button 36 and the LCD display 42 are seated in a side of the sheath 44 accessible to a user. The sheath 44 comprises a tubular translucent liner 44a arranged about its interior surface along the majority of the sheath's axis 44b of elongation. The LEDs 38 are arranged in a band, or line, inside the sheath 44 and its translucent liner 44a. The translucent property of the sheath's liner 44a helps to diffuse light from the LEDs 38 to make them glow with enhanced visibility to the user. The interior of the sheath 44 is sealed from the external environment by the glands 45a, 45b.

Optionally, the data processing device 22, the antenna reader 25, the internal antennas 28a, 28b, the battery pack 30 and the movement detector 40 may be housed elsewhere in the tool bay 2, for example in a pocket in a side wall 8a, 8b or an end wall 10a, 10b. This is provided that there is suitable protection from RFID-tagged tools 16 contained within the tool bay 6.

The battery pack 30 comprises rechargeable cells which supply the electrical circuit 20, via the antenna reader 25, with an electrical power supply of approximately 24V and 2.5 Amperes. The actual voltage and current of the power supply can vary according to manufacturer preferences without changing the character of the invention. Electrical current from the battery pack 30 is connected or disconnected to the antenna reader 25 by the on/off button 36 which is operable by the user.

The initialisation button 32 is operable by the user to initiate counting and identification of any RFID-tagged tools 16 located in the tool bay 6. The multicoloured LEDs 38 are illuminated different colours by the data processing device 22 to convey different optical signals to a user. The movement detector 40 comprises an accelerometer which is configured to detect movement of the tool bag 2. When the movement detector 40 detects movement of the tool bag 2 it transmits a movement detection signal to the data processing device 22. The internal antennas 28a, 28b have a range which is limited to detect RFID-tagged tools 16 located in the tool bay 6 only. This is to prevent the internal antennas 28a, 28b from making false detections of RFID-tagged tools 16 located outside the tool bay 6.

If present, the external antenna 34 is housed in a hand-holdable scanner case 46 which is detachably hooked to the of the tool bag 2. The external antenna 34 is coupled to the antenna reader 25 via a coiled wire 48 and a scanner activation button 50, as is explained in more detail below.

The antenna reader 25 is configured to read information from the internal antennas 28a, 28b on RFID-tagged tools 16 in the tool bay 6 and to read information from the external antenna 34 on RFID-tagged tools outside the tool bay 2. This information is supplied from the transponder reader device to the data processing device 22 which identifies the RFID-tagged tools 16 and records them in the memory 24. The LCD display 42 communicates information from the data processing device 22 to the user, for example the number of RFID-tagged tools 16 in the tool bay 6 and/or the identity of a missing RFID-tagged tool 16.

Use of the tool bag 2 shall now be described in more detail.

Initially, a user takes the tool bag 2 to a storage facility, for example a storeroom. The user operates the on-off button 36 to supply the electrical circuit 20 with electrical current and waits a few seconds for the electrical circuit 20 to be ready for use. The data processing unit 22 illuminates the LEDs 38 blue for a few seconds when the electrical circuit 20 is ready for use.

The user fills the tool bay 6 with RFID-tagged tools 16 required to perform a particular job. The storage facility is equipped with a key (not shown) with an RFID transponder programmed with data which authorises initialisation cycles of the electrical circuit 20. The user places the RFID-tagged key in the tool bay 6 and depresses the initialisation button 32. The transponder reader device 21, via the internal antennas 28a, 28b, detects the presence of the RFID-tagged key and an initialisation cycle begins. Note that without the presence of the RFID-tagged key an initialisation cycle is not authorised, in other words the transponder reader device 21 is locked against performing an initialisation cycle. When the transponder reader is unlocked by presence of the RFID-tagged key, the transponder reader device 21 counts and identifies RFID-tagged tools 16 located in the tool bay 6 and records an initial reference list of RFID-tagged tools 16 in the memory 24 of the data processing device 22. When the initialisation cycle is complete, the electrical circuit 20 illuminates the LEDs 38 green for a few seconds and indicates the number of the RFID-tagged tools 16 located in the tool bay 6 on the display 42. The green LEDs 38 reassure the user that the electrical circuit 20 has counted, identified and memorised the reference list of 'known' RFID-tagged tools 16 and that the tool bag 2 is ready to be transported from the storage facility. Optionally, the green LEDs 38 may be supplemented by an audible alarm.

Next, the user transports the tool bag 2 to a job site, positions the tool bag 2 near or at the job site and removes one or more RFID-tagged tools 16 required to do a job from the tool bay 6. RFID-tagged tools 16 can enter and exit the tool bay 6 without provoking a reaction from the electrical circuit 20 because it is dormant. This helps to reduce power consumption and extend the life of the battery pack 30 between recharges.

At the end of a job the user will want to move the tool bag 2 to another job site or return to the storage facility. The movement detector 40 detects movement of the tool bag 2 and the data processing device 22 automatically initiates a verification cycle of RFID-tagged tools 16 located in the tool bay 6. During the verification cycle, the transponder reader device 21, using the internal antennas 28a, 28b, detects the presence of RFID-tagged tools 16 in the tool bay 6. The data processing device 22 compares the RFID-tagged tools 16 actually located in the tool bay 6 with the reference list of 'known' RFID-tagged tools 16.

If the verification cycle reveals that the same RFID-tagged tools 16 are in the tool bay 6 as are on the reference list, the electrical circuit 20 illuminates the LEDs 38 green for a few seconds to reassure the user that no RFID-tagged tools 16 are absent. Optionally, the green LEDs 38 may be supplemented by an audible alarm.

If the verification cycle reveals that one or more 'unknown' RFID-tagged tools 16 are in the tool bay 6 that are not on the reference list, the electrical circuit 20 flashes the LEDs 38 red for a few seconds to warn the user. Optionally, the flashing red LEDs 38 may be supplemented by an audible alarm which is distinct from the audible alarm sounded when the LEDs 38 are illuminated green. This prevents the user from accidentally taking a RFID-tagged tool 16 that does not belong to the user.

If the verification cycle reveals that one or more RFID-tagged tools 16 on the reference list are absent from the tool bay 6 the electrical circuit 20 illuminates the LEDs 38 red for a few seconds to warn the user. Optionally, the illuminated red LEDs 38 may be supplemented by an audible alarm which is distinct from the audible alarm sounded when the LEDs 38 are illuminated green or when the LEDs 38 flash red. This avoids RFID-tagged tools 16 being left behind at the job and possibly remaining inside machinery where they can cause inestimable damage. The display 42 indicates the number and identity of absent RFID-tagged tools 16 so that the user knows what to search for.

If present, the scanner case 46 may be unhooked from the tool bag 2 by a user in search of stray RFID-tagged tools 16 outside the tool bay 6. The coiled wire 48 enables the scanner case 46 to be manoeuvred about the exterior of the tool bag 2. The user knows which RFID-tagged tools 16 to search for from the information on the display 42. The user depresses the scanner activation button 50 to activate the external antenna 34 of the transponder reader device 21. While the external antenna 34 is active the internal antennas 28a, 28b are inactive. When the external antenna 34 is active the electrical circuit 20 only searches for those RFID-tagged tools 16 that were identified as absent at the end of the verification cycle. The electrical circuit 20 confirms if one such absent RFID-tagged tool 16 is found by illuminating the LEDs 38 green. The user returns the found RFID-tagged tool 16 to the tool bay 6. The search for absent RFID-tagged tools 16 should normally continue until all are found. When all the absent RFID-tagged have been found and returned to the tool bay 6, the user releases the scanner activation button 50 and the external antenna 34 is automatically deactivated. Now the user can transport the tool bag 2 to another job site or return it to the storage facility. The movement detector 40 detects movement of the tool bag 2 and the data processing device 22 initiates another verification cycle of RFID-tagged tools 16 located in the tool bay 6. The new verification cycle should confirm that the same RFID-tagged tools 16 are in the tool bay 6 as are on the reference list. If so, the electrical circuit 20 will illuminate the LEDs 38 green for a few seconds to reassure the user that no RFID-tagged tools 16 are absent. If not, and the new verification cycle discovers that one or more RFID-tagged tools 16 on the reference list are still absent from the tool bay 6, the electrical circuit 20 illuminates the LEDs 38 red for a few seconds to warn the user. The user continues to search for missing RFID-tagged tools 16, preferably with the help of the external antenna 34.

Ultimately, the user will transport the tool bag 2 to the storage facility, put it down and empty the RFID-tagged tools 16 from the tool bay 6. The user places the RFID-tagged key in the tool bay 6 and depresses the initialisation button 32. The transponder reader device 21, via the internal antennas 28a, 28b, detects the presence of the RFID-tagged key so that a fresh initialisation cycle can begin. The electrical circuit 20 counts and identifies what should be zero RFID-tagged tools 16 in the tool bay 6. The reference list of RFID-tagged tools 16 recorded in the memory 24 is reset to zero. The electrical circuit 20 illuminates the LEDs 38 red for a few seconds to inform the user. The user operates the on-off button 36 to cut the supply of electrical current to the electrical circuit 20 and deactivate it. Thus, the tool bag 6 can be used with any number or combination of RFID-tagged tools 16 because the electrical circuit 20 is capable of re-counting and re-identifying the RFID-tagged tools 16 in the tool bay 6 to refresh the reference list recorded in the memory 24.

The battery pack 30 can be connected to a battery recharger (not shown) via battery socket 52 for recharging its empty cells as and when required. Battery charging is only possible when the electrical current from the battery pack 30 is disconnected by the on/off button 36.

The electrical circuit 20 can be fitted, or retro-fitted, to any portable container, for example tool cabinets, tool cupboards, tool boxes, backpacks, and the like, and not just the tool bag 2 described above.

The actual colours of the LEDs 38 chosen to indicate signals to the user can be varied according to manufacturer preferences without changing the character of the invention.

The invention claimed is:

1. A portable container for one or more articles each tagged with a respective Radio Frequency Identification (RFID) transponder, the container having at least one opening into the container and a detector device for detecting removal and/or placement of RFID-tagged articles in or outside the container, wherein the container comprises:
 a power supply for supplying electrical power to the detector device, wherein the detector device is structured to be selectively detachable and is configured to activate an internal or external antenna for detecting RFID-tagged articles;
 an activation means, wherein the activation means is at least one of an electrical circuit, initialization button, or scanner activation button in communication with the detector device, and wherein the activation means is operable to cause the detector device to detect a reference list of RFID-tagged articles located in the container;
 a verification means, wherein the verification means is at least one of a data processing device, movement detector, or accelerator in communication with the detector device, and wherein at least one of the verification means is housed within a cavity in the container and is operable by movement of the container to cause the detector device to activate the internal antenna to detect RFID-tagged articles located in the container and to signal deviation from the reference list;

a signal means, wherein the signal means is at least one of an optical signal, an audible signal, or tactile signal in communication with the detector device for transmitting signals from the detector device to a user; and wherein the user can selectively operate the detector device to activate the external antenna for detecting RFID tagged articles identified as absent in the reference list of RFID-tagged articles located in the container.

2. The portable container as claimed in claim 1, wherein the detector device is configured to signal an article absent signal upon detection of absence of a RFID-tagged article on the reference list and the detector device is configured to signal a unknown article signal upon detection of a RFID-tagged article not on the reference list.

3. The portable container as claimed in either one of claim 1 or 2, wherein the detector device is lockable against detection of the reference list, optionally wherein the detector device is configured to signal an initialisation signal upon location in the container of a RFID-tagged key configured to permit detection of the reference list.

4. The portable container as claimed in claim 1, wherein the signal means includes at least one LCD.

5. The portable container as claimed in claim 1, wherein the signal means includes at least one LED, optionally wherein the or each LED is a multicoloured LED.

6. The portable container as claimed in claim 5, wherein the container includes a translucent body optically coupled to the or each LED.

7. The portable container as claimed in claim 6, wherein the container includes a handle and wherein the translucent body forms at least part of the handle.

8. The portable container as claimed in claim 2, wherein the signal means includes a display configured to display the number and/or identity of RFID-tagged articles detected by the detector device in the container.

9. The portable container as claimed in claim 8, wherein the display is configured to display the article absent signal and wherein the article absent signal includes the number and/or identity of absent RFID-tagged articles.

10. The portable container as claimed in claim 1, wherein the detector device includes a transponder reader device further comprising an antenna reader and at least one internal antenna in communication with the antenna reader and wherein the or each internal antenna is configured to detect only RFID-tagged articles in the container.

11. The portable container as claimed in claim 10, wherein the detector device includes an external antenna in selectable communication with the antenna reader and wherein the external antenna is configured to detect RFID-tagged articles outside the container, optionally wherein the external antenna is configured to detect only RFID-tagged articles on the initial reference list.

12. The portable container as claimed in claim 11, wherein the external antenna is portable in relation to the container.

13. The portable container as claimed in claim 1, wherein the detector device includes a data processing device having a central processing unit and a memory for recording at least the reference list.

14. The portable container as claimed in claim 1, wherein the container is one of a tool cabinet, a tool cupboard, a tool box, or a tool bag and configured for containment of one or more RFID-tagged tools.

15. A method of detecting removal and/or placement of articles in a container, wherein each article is tagged with a respective Radio Frequency Identification (RFID) transponder, wherein the container has at least one opening into the container, a detector device structured to be selectively detachable and configured for detecting removal and/or placement of RFID-tagged articles in or outside the container, a power supply for supplying electrical power to the detector device, at least one of an electrical circuit, initialization button, or scanner activation button in communication with the detector device, at least one of a data processing device, movement detector, or accelerator in communication with the detector device, and at least one of an optical signal, an audible signal, or tactile signal in communication with the detector device for transmitting signals from the detector device to a user, and wherein the method comprises the steps of:

(a) operating the at least one of an electrical circuit, initialization button, or scanner activation button to cause the detector device to detect a reference list of RFID-tagged articles located in the container and optionally to detect a RFID-tagged key configured to permit detection of the reference list;

(b) operating the at least one of a data processing device, movement detector, or accelerator by movement of the container to cause the detector device to activate an internal antenna to detect RFID-tagged articles located in the container and to signal detection of deviation from the reference list; and (c) when deviation from the reference list is determined, selectively operating the detector device to activate an external antenna for detecting the RFID tagged articles identified as absent in the reference list of RFID-tagged articles located in the container.

16. A portable container for one or more articles each tagged with a respective Radio Frequency Identification (RFID) transponder, the container having at least one opening into the container and a detector device for detecting removal and/or placement of RFID-tagged articles in or outside the container, wherein the container comprises:

a power supply for supplying electrical power to the detector device, wherein the detector device is structured to be selectively detachable and configured to activate a pre-determined antenna for detecting RFID-tagged articles;

an activation button in communication with the detector device, wherein the activation button is operable to cause the detector device to detect a reference list of RFID-tagged articles located in the container;

a data processing device in communication with the detector device, wherein the data processing device is operable by movement of the container to cause the detector device to activate an internal antenna to detect RFID-tagged articles located in the container and to signal deviation from the reference list; and an optical signal in communication with the detector device for transmitting signals from the detector device to a user, wherein the user can selectively operate the detector device to activate an external antenna for detecting RFID tagged articles identified in the deviation signal.

17. The portable container as claimed in claim 16, wherein at least the data processing device is housed within a cavity of a base in the container.

* * * * *